United States Patent [19]
Fredriksson et al.

[11] 3,948,643
[45] Apr. 6, 1976

[54] METHOD FOR REFINING STEEL
[75] Inventors: Bengt Fredriksson; Jan Uggla, both of Vasteras, Sweden
[73] Assignee: Allmanna Svenska Elektriska Aktiebolaget, Vasteras, Sweden
[22] Filed: Feb. 21, 1974
[21] Appl. No.: 444,654

[30] Foreign Application Priority Data
Feb. 23, 1973 Sweden............................ 7302555

[52] U.S. Cl.......................................... 75/13; 13/29
[51] Int. Cl.²...................... C21C 5/52; H05B 5/14
[58] Field of Search................ 75/13, 43, 46; 13/29

[56] References Cited
UNITED STATES PATENTS

| | | | |
|---|---|---|---|
| 2,648,715 | 8/1953 | Lillienberg............................. | 13/29 |
| 2,674,639 | 4/1954 | Stevenson............................. | 13/29 |
| 2,936,329 | 5/1960 | Tama..................................... | 13/29 |
| 2,939,899 | 6/1960 | Edstrand............................... | 13/29 |
| 3,467,167 | 9/1969 | Mahin................................... | 75/46 |

*Primary Examiner*—Peter D. Rosenberg
*Attorney, Agent, or Firm*—Kenyon & Kenyon Reilly Carr & Chapin

[57] ABSTRACT
Unrefined steel is refined by the use of a refining slag in a furnace having two pressure-tightly interconnected, pressure-tightly covered upper and lower hearths having channeltype inductors for heating and stirring steel melts in the hearths, the refining being effected in the upper hearth only and which is of relatively small capacity and has its inductor tilted to effect vigorous melt flow. The refining is continued, batch after batch, with each batch transferred to the lower hearth which is of substantially larger capacity and where the refined steel can be held at a temperature lower than required for its refining, to obtain a volume of refined steel adequate for steel plant casting purposes. Gas pressure in the lower hearth maintains the melt level in the upper hearth as required during the refining, this gas pressure being lowered to transfer each batch of refined steel to the larger lower hearth, and then being increased again for the next refining operation. Finally, for tapping the refined steel in the large lower hearth, the gas pressure is raised in the latter and the accumulated melt is forced through an appropriately positioned tap hole. The small capacity and tilted inductor of the upper hearth makes it possible to use the channel-type inductor for steel refinement with a reactive slag; the lower temperature required for holding the accumulated melt makes practical the use of the channel-type inductor in the case of the lower hearth of large enough capacity for steel plant casting.

1 Claim, 4 Drawing Figures

METHOD FOR REFINING STEEL

BACKGROUND OF THE INVENTION

This invention relates to a method for refining steel. Various prior art steel refining methods are well known and are disclosed in many texts, an example being "The Making, Shaping and Treating of Steel", 7th Edition, published by the U.S. Steel Corporation, copyrighted 1957, this text being hereby incorporated into this application for the benefit of any reader unfamiliar with such prior art methods.

A general characteristic of these prior art methods is that steel is both manufactured and refined in the same furnace from which it is tapped ready for casting. Therfore, the furnace must have a hearth which holds a volume of refined steel adequate for the casting requirement involved. This volume must be relatively large to meet normal steel plant requirements, particularly when it is to provide a feed for continuous steel casting equipment. In the case of duplexing, incompletely refined steel is produced by the converter, the open hearth or electric furnace which receives this steel then completing the refining in one hearth which must have adequate capacity for the casting requirements. Usually the refined melt is tapped into a teeming ladle from which the steel is teemed as required by the casting requirements, the steel thus being exposed to the atmosphere with undesirable results.

In the ASEA-SKF process, exemplified by the Swedish Pat. No. 323,156 and by the British Pat. No. 1,112,876, unrefined steel is poured in a ladle and while in this ladle is inductively stirred while covered by a pressure-tight cover having evacuating means for degassing, this cover is removed and replaced by a cover provided with arcing electrodes for the refinement, particularly for desulfurizing, possibly while also being inductively stirred, the ladle finally being uncovered and the steel teemed through a bottom teeming hole which is opened at that time. This practice requires a large investment in equipment and the application and removal of the different covers and other problems, although this practice has been commercially fully successful.

In general, all prior art steel making and refining practices have required the use of an extremely large investment in expensive equipment, in general the need to transfer the melt from one furnace to another or to a ladle, and in all cases have involved a substantial amount of atmospheric pollution and noise.

The Folgero and Fredrikson U.S. Pat. application Ser. No. 342,368, filed Mar. 19, 1973, now U.S. Pat. No. 3,851,090, granted Nov. 26, 1974 discloses and claims a new form of channel-type induction furnace particularly intended for use in melting down chips of metal and which is substantially free from atmospheric pollution and noise.

The above channel-type electric induction furnace has horizontally and vertically offset upper and lower gas-pressure-tightly covered hearths of substantial depths with an approximately vertical duct interconnecting the lower portions of the two hearths pressure-tightly. This duct has a normally closed tap hole in an upper portion, the two hearths having bottoms each provided with a channel-type inductor for heating and stirring metal melts in the hearths, the upper hearth's inductor being tilted towards the duct.

This furnace was invented for the purpose of melting down scrap metal, particularly brass chips, although the melting of all kinds of scrap metal was contemplated. The furnace construction is considerably less expensive than other types of electric furnaces capable of holding an equal volume of melt. The whole furnace is in the form of a closed unit; no loss of metal by oxidation and consequently a reduction in atmospheric pollution are inherent advantages.

Channel-type induction furnaces have not heretofore been used for the refinement of steel although they have been used in duplexing operations, particularly as a source of the melt for continuous casting operations. Such furnaces have been used to make steel additions, for deoxidizing, vacuum treatment and temperature adjustment. Channel-type induction furnaces have not been used in the steel industry for the refinement of steel for the following reasons:

The channel which must carry the melt loop forming the secondary of the inductor has not been able to withstand the high temperatures involved by steel refining operations in the case of a furnace having a hearth of adequate capacity to provide the volume of melt normally required for casting in the case of steel.

After casting of each melt, it has been necessary to leave a melt sump in the hearth and in the channel of the inductor. This is a particular disadvantage in the case of a large furnace if used for steel refining with the consequent requirement of the use of high temperatures with their destructive effects on the channel of a channel-type inductor furnace.

SUMMARY OF THE INVENTION

According to the present invention, the Folgero and Fredrikson furnace of the previously identified U.S. application, and previously described briefly hereinabove, is used for the refinement of steel, as contrasted to being used only as a melting furnace for melting and storing a homogenized melt, particularly non-ferrous in character and to which additions may be made but without any contemplation of steel refinement such as requires the use of chemically reactive fluxes.

Using such a furnace, in the practice of the present invention, the upper hearth is charged with a charge of steel requiring at least final refining, and the upper hearth's inductor is operated to form an inductively stirred melt while maintaining a gas pressure in the lower hearth to hold the melt in the upper hearth, the lower hearth containing a melt of steel previously transferred to it from the upper hearth. The inductively stirred melt in the upper hearth is refined by appropriate prior art techniques such as by reaction with a desulfurizing agent, degassing by evacuation of the upper hearth, and possibly alloying additions may be made to the melt in the upper hearth. After this refinement, the gas pressure in the lower hearth is reduced so that the refined steel melt is transferred to the lower hearth where its inductor is operated to maintain the transferred melt at a holding temperature or one suitable for ultimate tapping. The upper hearth is used repeatedly to refine batch after batch of the steel, each batch being transferred to the lower hearth is made with a volumetric capacity very substantially greater than that of the upper hearth, the latter being comparatively small.

The desulfurizing agent, and other possible reactive refining agents, form a slag on each melt refined in the upper hearth; the latter has a normally closed slag discharge port in its upper portion. After refinement of each melt batch, the gas pressure in the lower hearth is increased so that metal in that hearth via the interconnecting conduit raises the level of the refined melt in the upper hearth to one where, when the normally closed slag discharge port is opened, the slag floating on the melt can be discharged.

When the lower hearth holds an amount of refined steel sufficient for the casting requirement involved, a normally closed tap hole in the upper portion of the interconnecting conduit, is opened, the gas pressure in the lower hearth is increased and the refined steel melt is forced through the tap hole.

The lower hearth may be made large enough in capacity to supply even continuous casting equipment; the use of a small upper hearth, using the tilted inductor, permits the practice of all electric furnace steel refining methods without the destructive effects that would be involved by operation of a channel-type inductor having the capacity to provide the high melt temperatures required for steel refinement methods in the case of a hearth having the same large capacity as does this lower hearth.

BRIEF DESCRIPTION OF THE DRAWINGS

The accompanying drawings schematically shows various steps in the practice of an example of the present invention, the various figures being as follows.

DETAILED DESCRIPTION OF THE INVENTION

Figure 1:
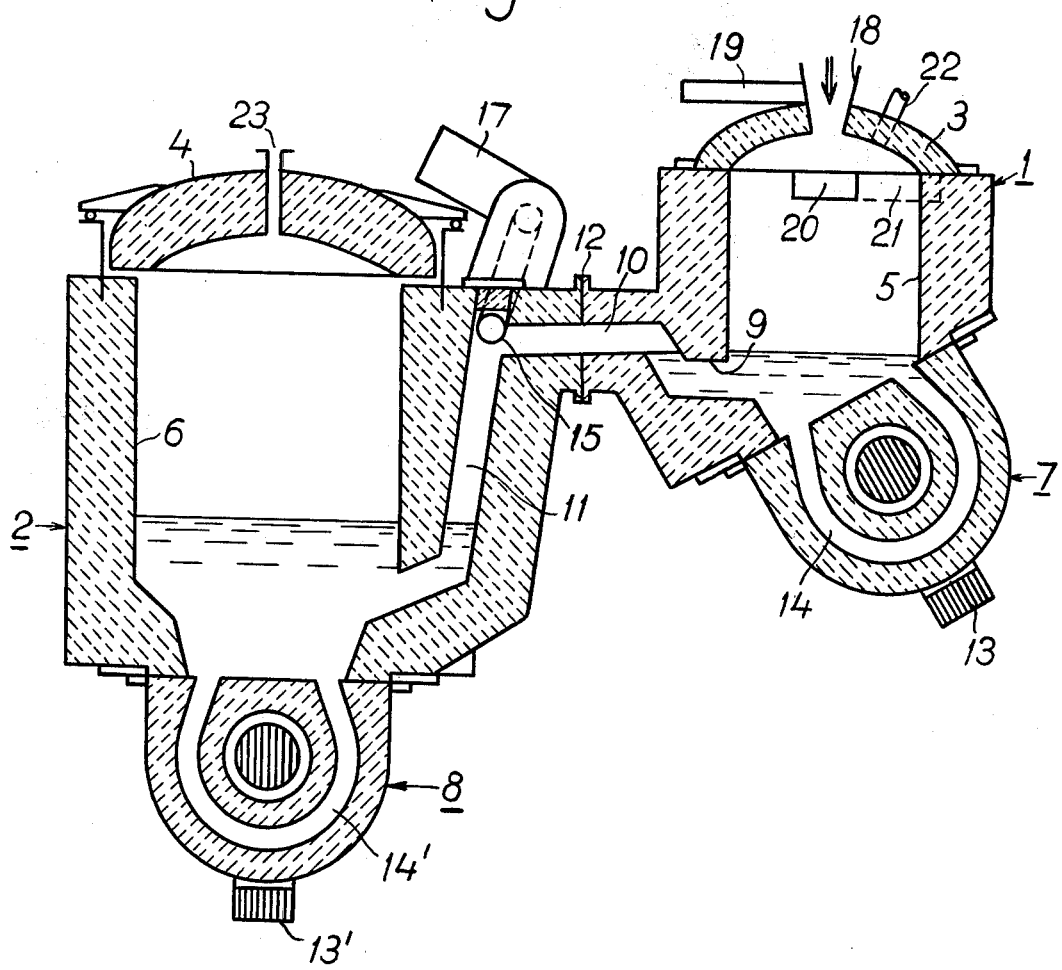
FIG. 1 in vertical section shows the described type of what may be called a double channel-type inductor furnace with both furnace hearths containing a steel sump melt and the furnace as a whole ready for the start of the new steel-making method.

Having reference first to FIG. 1, the small upper furnace 1 is horizontally and vertically offset from the lower large furnace 2 and both furnaces have gas-pressure-type covers 3 and 4, respectively. Both furnaces have hearths 5 and 6, respectively, which vertically extend substantial distances in crucible-like manner, the hearth 6 being of substantially greater volumetric capacity than the hearth 5. Both hearths have bottoms provided with channel-type inductors 7 and 8, respectively. The hearths interconnect via a duct which extends from the hearth 5 under a slag-slimmer 9 to a horizontal portion 10 and then to an approximately vertical portion 11 of adequate length. This duct interconnects the lower portions of the hearths 5 and 6. The horizontal portion 10, which is slightly declined but substantially horizontal, interconnects the two furnaces mechanically via a separable flange 12 permitting removal of the upper furnace 1 for repair or replacement by another corresponding small furnace.

The inductors 7 and 8 each have the usual primary 13 and 13′, respectively, and the channels 14 anad 14′, respectively, which when filled with the melt form the secondary circuits. The difference between the two is that the inductor 7 is tilted, such as about 30°, from a vertical position towards the duct opening formed beneath the slag-skimmer 9, whereas the inductor 8 is vertically aligned. At the junction between the duct's horizontal portion 10 and generally vertical portion 11, a normally closed tap hole 15 is formed, this opening via a short duct connecting with a tapping spout 16, a pressure-tight valve closure 17 being schematically illustrated.

The pressure-tight cover 3 of the furnace 1 is provided with a charging chute 18 which may be closed pressure-tightly by a valve closure 19 as schematically illustrated. The furnace 1 also has in its upper portion a slag tapping hole 20 provided with a pressure-tight closure indicated by broken lines at 21. The furnace 1 has its cover 3 provided with a gas connection 22; the furnace 2 has its cover provided with a gas connection 23.

In the practice of the present invention, the furnace 1 is used as the steel refining furnace and the furnace 2 is used as a holding furnace, the latter's hearth 6 being made with an adequate capacity to hold enough metal for tapping as required by practically all steel casting operations, including continuous casting.

Figure 2:
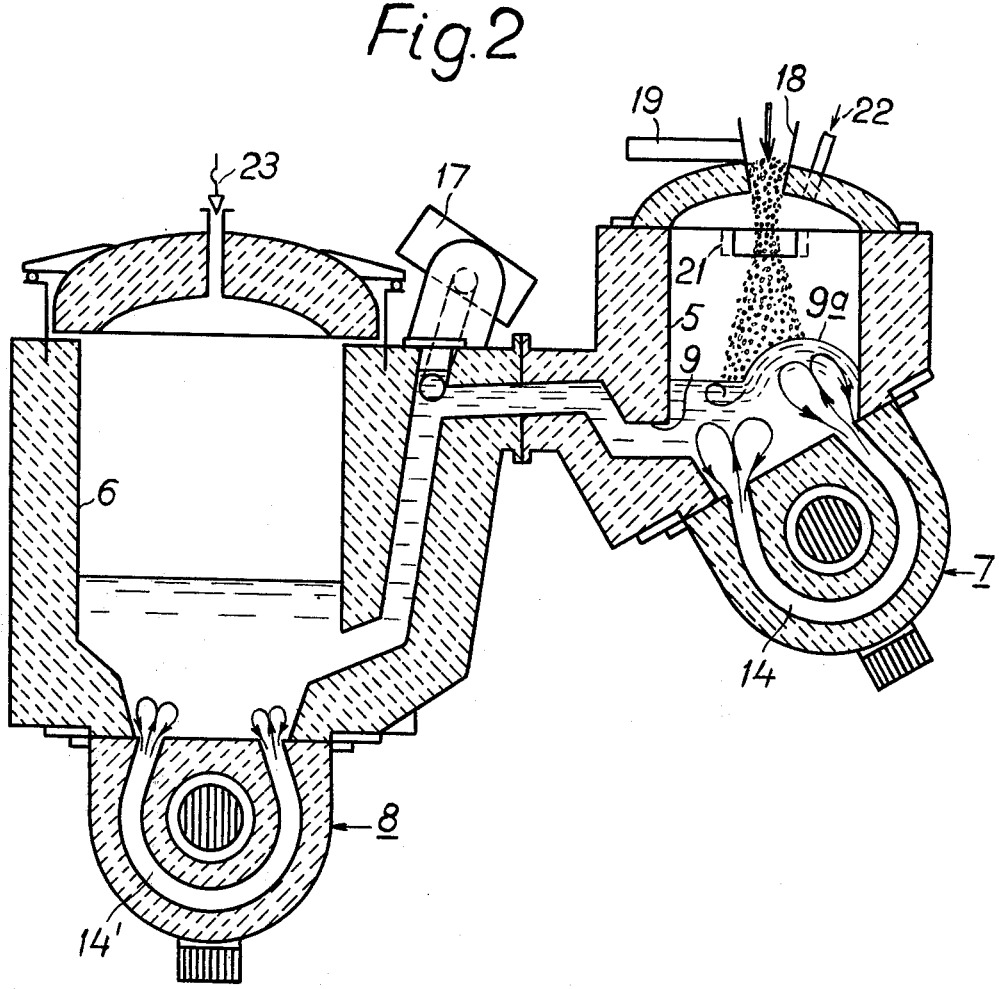
FIG. 2 is the same as FIG. 1 but shows the steel refining in progress.

The furnace 2 via the gas connection 23 is filled with an inert gas, such as argon, nitrogen, etc., under pressure, when an unrefined steel charge is introduced via the opened chute 18 to the hearth of the furnace 1 as shown at B in FIG. 2. This pressure in the hearth 6 of the lower furnace 2 is made high enough to hold up the melt forming at increasing heights in the hearth 5 of the furnace 1, via metal displaced from the hearth 6 reversely through the interconnecting duct. Due to the tilt of the energized inductor 7 the melt in the furnace hearth 5 is formed with a meniscus or upward bulge shown at 7a in FIG. 2. Also, the flow velocity of the steel in the channel 14 is high, due to this tilt and the small size of the melt in the hearth 6 receiving the inductive stirring effect of the induced currents. The hearth 5 is relatively very small; it is too small for use alone for steel casting purposes in a steel plant.

These factors make it practical for the furnace 1 to be used as a steel refining furnace, the charge B including chemically reactive slag-forming materials for the refining, such as, for example, desulfurizing agents for desulfurizing the steel charge introduced to the upper furnace's hearth 5.

After charging, the chute 18, opened for the charging, is closed fluid-tightly by its closure 19 and the steel refining operation proceeds at the necessary high temperature and preferably while protected by an inert gas, such as argon, nitrogen, etc., introduced to the upper furnace via its gas connection 22. Deoxidizing agents may be introduced to the melt, an example being aluminum. During this refining operation, there is no pollution of the atmosphere, the furnace 1 providing a complete enclosure, and there is practically no noise. Due to the tilt of the inductor 7 and the small volume of melt, the melt is very rapidly stirred so that the refining agents are stirred into the steel melt to provide for very rapid reactions.

Furthermore, because of this small melt volume, the tilt of the inductor, and possibly because the inductor may be economically made with a large size relative to the melt volume, the melt flow velocities in the channel 14 are so high that overheating in this channel does not occur. Therefore, the channel refractory has a service life long enough for commerical requirements. The drawings show both hearths using the same size of inductor. Any attempt to refine the steel in the large lower hearth 6 would result in rapid destruction of its inductor channel 14′.

With the completion of the refinement operation the refined batch of steel in the furnace 1 may be degassed by using the connection 22 for evacuation of the hearth 5. All of the refining operations of the ASEA-SKF process previously described may be carried out in the relatively small channel-type induction furnace 1. The refining time is short because of the small melt volume and its rapid and vigorous stirring by the tilted inductor.

Figure 3:
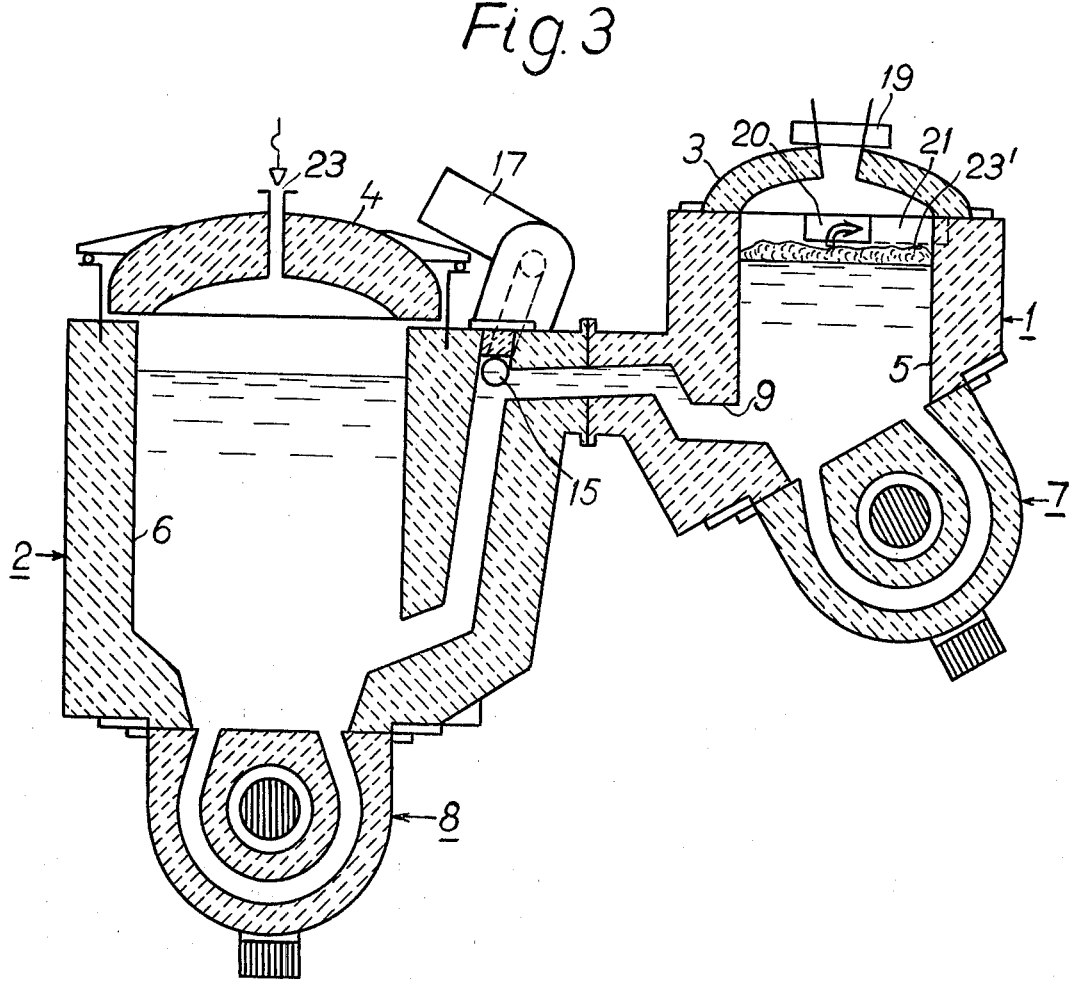
FIG. 3 again shows the furnace as in FIG. 1 but with tapping of the refined melt in progress.
Figure 4:
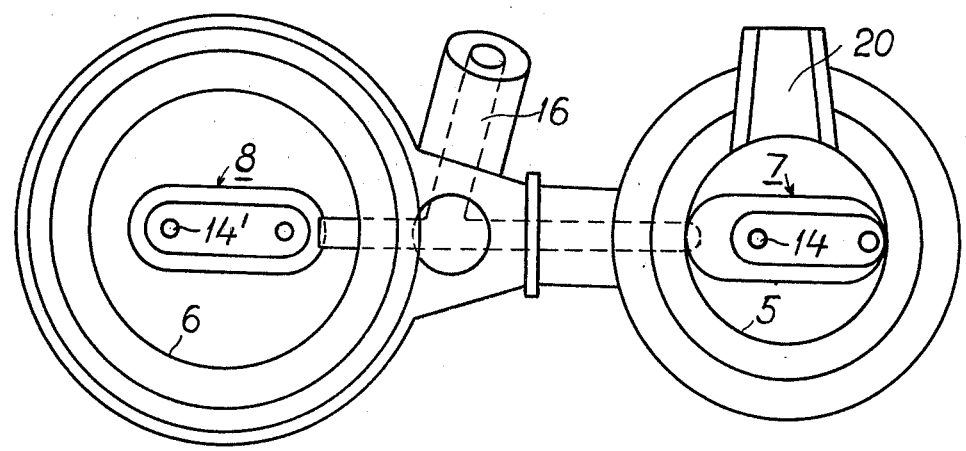
FIG. 4 is a top view with the covers removed.

The refining agents, of course, produce a slag floating on the melt in the furnace 1, as indicated at 23 in FIG. 3. The majority of this slag is removed by increasing the gas pressure in the hearth 6, via its connection 23, to raise the level of the now refined melt of steel in the hearth 5, so that with the slag opening or tap hole 20 having its closure 21 opened, the slag can be caused to discharge through this opening. Thereafter the gas pressure in the hearth 6 is reduced so that the refined melt flows via the interconnecting passage into the hearth 6, any remaining slag being skimmed off by the slag-skimmer 9, it being understood that the level of the melt in the hearth 5 is maintained a little above that of this slag-skimmer, by adjustment of the gas pressure in the furnace 2.

In the above way batch after batch of unrefined steel is refined in the small upper furnace 1 and transferred to the lower large hearth 6. The steel is never exposed to the outer atmosphere during its transfer from the small furnace to the large holding furnace 2. Ultimately this large holding furnace 2 has in it hearth 6 a refined steel melt of adequate volume for casting. The temperature of this melt has been held as required, by the inductor 8, but temperatures involved are substantially lower than those required for the steel refining operations in the small upper furnace 1. This is true even though the melt in the large hearth 6 may be subjected to what might be called overheating; its final temperature is always adjusted as required for casting operations. Being a large furnace, the flow velocities in the channel 14' do not approach those provided in the channel 14 where in the latter the smaller steel volumes are involved and the inductor 7 is tilted. Because of the lower temperatures, the inductor channel 14' can be expected to have a satisfactorily long service life. The action of the inductor 8 required for maintenance of a holding temperature, also inductively stirs the melt and homogenizes it thoroughly, intermixing the various batches of which it is formed.

With an adequate volume of melt of refined steel in the hearth 6 of the furnace 2, and with the chute 18 and slag discharge opening 20 fluid-tightly closed, the tapping hole 15 is opened by opening of the closure 17, while the gas pressure in the hearth 6 is increased via the gas connection 23 of the cover 4, the gas pressure in the hearth 5 being correspondingly increased via the gas connection 22 as required to hold the sump melt in the hearth 5 against excessively rising. The result is a continuous discharge of refined metal through the spout 16. This discharge is under pressure and may be used for pressure casting purposes. The large volume available permits the tapped metal to be used as a supply for continuous steel casting equipment.

After the completion of the tapping operation, both hearths 5 and 6 contain the sump melts as noted earlier. Repetition of the previously described practice produces another large heat of refined steel. The sump melts cause no trouble; the sump metal in the channel 14 becomes part of the next refining operation; that in the channel 14' is small as compared to the volume of the hearth 6.

The upper, smaller or batch furnace 1 provides for a vigorous stirring of the refining steel due to the formation of the strong meniscus 7a formed in the melt by the tilted inductor 7. Very good stirring is effected. Objectionable fumes cannot escape into the atmosphere. Because of the complete enclosure and the very rapid stirring effect, powdered slag formers and deoxidizing agents such as powdered burnt lime, aluminum powder, etc. can be brought into intimate and rapid mixing with the steel bath. Particularly in the case of desulfurizing a very rapid purification or refining is obtained. There is no risk of the channel 14 being heated to destructive temperatures.

Because of the small batch refined in the upper small furnace, the refining times are relatively short in comparison with conventional processing. The unrefined steel may be introduced through the chute 18 either in molten condition or in the form of relatively fine solid pieces. The feed to the upper furnace 1 may be continuous to effect a continuously rising melt in that furnace. When the capacity of the small upper furnace is reached, the refined melt that has accumulated may than be deoxidized if required, after deslagging, whereupon it is transferred while completely closed against contact with the atmosphere, to the large holding hearth 6 where its surface is contacted only by the inert pressurizing gas introduced via the gas passage 23.

In the case of pressure casting the refined melt may be pressure-cast from the hearth 6 directly into the bottoms of the pressure casting molds, one after another without ever being exposed to the atmosphere.

With time the steel refining furnace 1 may require repair of its lining or hearth and of its inductor channel. In such a case this small upper furnace 1 may be disconnected via the flange connection 12 from the large furnace 2 which due to its size would ordinarily be stationarily mounted. The small upper steel refining furnace 1 may than be replaced by another which has been kept in repair or is new, or itself repaired conveniently and replaced. Due to the relatively lower temperatures involved in the operation of the holding furnace 2, its hearth 6 and inductor 8 should have a long service life. The inductor 8 is required only to hold the melt in the hearth molten, for stirring, for homogenization, and to adjust the melt to the desired tapping temperature.

What is claimed is:

1. A method for refining steel in a channel-type electric induction furnace having an enclosed upper hearth provided with a slag tapping hole, a lower gas-pressure-tightly enclosed hearth, said hearths having lower portions, and a closed duct interconnecting the lower portions of said hearths pressure-tightly and forming a gravity flow path from said upper hearth to said lower hearth, said duct having a normally closed melt tap hold in an upper portion positioned above said lower hearth, said hearths having bottoms provided with channel-type inductors of which the upper hearth's inductor is tilted towards said duct; characterized by the use of gas pressure in the lower furnace to control the flow of molten metal into said lower furnace and the removal of slag from the upper furnace.

* * * * *